United States Patent
White

(10) Patent No.: US 6,810,924 B2
(45) Date of Patent: Nov. 2, 2004

(54) COMPRESSED GAS STREAM INTRODUCTION METHOD AND FILLING STATION

(75) Inventor: Norman Henry White, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/388,451

(22) Filed: Mar. 17, 2003

(65) Prior Publication Data

US 2004/0182470 A1 Sep. 23, 2004

(51) Int. Cl.[7] ............................................... B65B 1/04
(52) U.S. Cl. ................... 141/82; 222/146.2; 222/146.5
(58) Field of Search .............................. 141/2, 18, 37, 141/82, 67; 222/146.2, 146.5; 62/45.1, 50.1, 50.2

(56) References Cited

U.S. PATENT DOCUMENTS

| | | | |
|---|---|---|---|
| 5,243,821 A | 9/1993 | Schuck et al. | 62/50.6 |
| 5,315,831 A | 5/1994 | Goode et al. | 62/7 |
| 5,520,000 A | 5/1996 | Pevzner | 62/48.1 |
| 5,590,535 A * | 1/1997 | Rhoades | 62/50.2 |
| 5,628,349 A | 5/1997 | Diggins et al. | 141/3 |
| 5,771,946 A * | 6/1998 | Kooy et al. | 141/82 |
| 5,787,940 A | 8/1998 | Bonn et al. | 141/18 |
| 5,934,081 A | 8/1999 | Notaro et al. | 62/50.2 |
| 6,432,283 B1 | 8/2002 | Fairlie et al. | 204/230.2 |
| 6,644,039 B2 * | 11/2003 | Hughes et al. | 62/49.1 |

FOREIGN PATENT DOCUMENTS

WO        02064395        8/2002

OTHER PUBLICATIONS

Trill, "Hydrogen as Alternative Fuel", Linde AGA, BMW CleanEnergy Seminar (2002).

* cited by examiner

*Primary Examiner*—Steven O. Douglas
(74) *Attorney, Agent, or Firm*—David M. Rosenblum

(57) ABSTRACT

A method and filling station are disclosed for introducing a compressed gas stream into one or more vessels such that upper and lower temperature material limits are not exceeded and preferably such vessels are not over or under filled by controlling the filling temperature of the compressed gas stream. The compressed stream is produced by compressing a stream composed of a vapor phase located within a cryogenic liquid storage tank. The density of the vapor phase is held constant by adding heat to a liquid phase, preferably by addition of a subsidiary stream composed of the compressed gas stream. The filling temperature of the compressed gas stream is controlled by adding heat to the compressed gas stream by a trim heater or to the vapor stream to be compressed by recirculating part of the compressed gas stream to an inlet of the compressor.

13 Claims, 2 Drawing Sheets

COMPRESSED GAS STREAM INTRODUCTION METHOD AND FILLING STATION

FIELD OF THE INVENTION

The present invention relates to a method and filling station for introducing a compressed gas stream into one or more vessels with a controlled filling temperature. More particularly, the present invention relates to such a method and filling station in which a vapor phase stream composed of a vapor phase of a cryogen stored within a cryogenic, liquid storage tank is compressed to form the compressed gas stream that is introduced into the vessel(s). Even more particularly, the present invention relates to such a method and filling station in which a liquid phase of the cryogen is heated to maintain the vapor phase at a constant density and a filling temperature of the compressed gas stream is controlled by selective addition of heat thereto.

BACKGROUND OF THE INVENTION

In filling various vessels with compressed gases within set time intervals, the temperature of the compressed gas within the vessel will tend to rise due to the inability of the vessel to dissipate the heat produced from the enthalpy of the incoming compressed gas. Such vessels can be compressed gas cylinders that are used to store industrial gases and vehicle fuel tanks in which a fuel in the form of compressed natural gas or hydrogen is to be stored.

In all such filling applications, it is important to control the temperature of the compressed gas within the vessel being filled. An important reason for such temperature control is to ensure that the vessel is filled to capacity. For instance, if the temperature within the vessel being filled is allowed to rise, the pressure of the compressed gas within the vessel will eventually drop to a pressure in equilibrium with ambient temperature (the settle pressure) as heat dissipates from the vessel. Thus, the pressure reached within the vessel during filling will not guarantee that the vessel will be filled to the desired capacity. As a result, either the vessel has to be topped off after having been initially filled, or the filling pressure has to be raised substantially in excess of the settled pressure, or the filling has to be accomplished at a rate slow enough so that near ambient temperature conditions are maintained within the vessel during vessel filling.

As may be appreciated, such a filling procedure is time consuming and therefore not very desirable in industrial filling applications. It is particularly undesirable in vehicle fuel tank filling applications in that consumers have an expectation of filling times with respect to alternative fuels, such as compressed natural gas and hydrogen, that are comparable to those experienced with conventional petroleum based fuels. Preferably, a vehicle fuel tank should be able to be completely filled from an empty condition with compressed natural gas or hydrogen in between about three and about five minutes.

When very short filling times are contemplated, such as time periods that have been discussed above, another problem surfaces. The time period is so short that the heat generated during filling can exceed the upper structural limiting temperature of the tank being filled. Additionally, when the compressed gas such as hydrogen is to be stored as a liquid, the resultant filling temperature can be below the lower structural limiting temperatures of the fuel tank. At such temperatures, failure occurs due to materials becoming brittle. These problems can be particularly exacerbated in fuel tanks that are designed to store hydrogen. In order for the vehicle to have sufficient range, hydrogen gas must be stored at anywhere from between about 5,000 psi and about 10,000 psi. A fuel tank designed to hold such pressure, if conventionally fabricated, would be quite heavy. Therefore, such fuel tanks are and will be fabricated from lighter materials such as carbon fiber and resin. The tank mass to gas ratio in carbon fiber reinforced tanks is much lower than the ratio for conventional tanks. Consequently, these lighter tanks are more prone to encounter high temperatures during filling.

The problem of filling pressure vessels to a desired pressure with reasonable time periods has been dealt with in at least one patent, namely, U.S. Pat. No. 5,934,081. In such patent, in order to ensure that compressed gas cylinders are completely filled, without being topped off, the filling temperature of the compressed gas is controlled. In this patent, the gas is stored within a cryogenic liquid storage tank. A liquid stream, composed of the liquid phase, is pumped and then vaporized within a vaporizer. Pressure within the tank is maintained by a pressurized stream of pumped liquid that is vaporized and fed to a head space of the liquid storage tank and into the vapor phase. Another stream of liquid, pressurized by the pump, is left unvaporized and introduced into the vaporized stream from the vaporizer to cool the compressed gas being introduced into the cylinders by direct heat exchange.

The problem with the foregoing patent is that the liquid storage tank must be located above the pump in order to allow gravity feeding to the pump. In order to allow for the underground storage of liquid, in U.S. Pat. No. 5,787,940, which concerns the use of liquefied natural gas as a fuel source, an underground storage tank is disclosed that also has an associated sump and a submerged pump to pump a stream of liquefied natural gas above ground to a liquefied natural gas fueled vehicle. The advantage of the sump is to allow for pump maintenance through the sump. In any case, the pumped liquid has to be vaporized and therefore, such a system is rather complex and difficult to control.

The problem of filling vehicle fuel tanks with hydrogen has been recognized in U.S. Pat. No. 6,432,283. In this patent, a hydrogen fueled replenishment system is disclosed in which hydrogen is generated onsite by an electrolytic cell. The hydrogen is compressed to a filling pressure and in order to compensate for the resultant temperature rise, the fill rate is adjusted to accomplish delivery to the vehicle within a minimum of time to meet the filling requirements of the vehicle. In another system disclosed in U.S. Pat. No. 5,628,349 that involves the dispensing of a pressurized gas, for instance, ompressed natural gas from a pressurized gas source, the temperature within the receiving tank is monitored and is used by a computer to adjust the fill pressure to compensate for the temperature and pressure rise occurring within the compressed gas during the filling of the tank. The problem with both of these systems is that they would have limited utility with respect to lightweight, carbon fiber fuel tanks for use in hydrogen fueled vehicles due to the higher pressures involved and the relatively short fill time periods.

As can be appreciated from the above discussion, an advantageous filling station would utilize an underground storage tank in which the compressed gas to be dispensed were stored as a liquid and gas was compressed from the vapor phase. The problem with such operation is that as gas is taken from the vapor phase, the pressure decreases within the storage tank. This results in inefficient compressor operation. In U.S. Pat. No. 5,520,000 a system is disclosed that is designed to deliver a gas, such as hydrogen for a hydrogen fuel tank at a temperature of 6,000 psia in a manner that maximizes the compressor output. This is accomplished by using a gas liquid mixer before the compressor or compressor stages in which gas and liquid are mixed in a packing contained within a miniature column to control the temperature of the gas entering the compressor and thereby maximize the output rate of the compressor. The temperature of the gas that is introduced into a storage bank is controlled by either heating or cooling the gas in a subsequent heat exchanger.

U.S. Pat. No. 5,243,821 discloses a method of delivering a high pressure gas in which a piston-type pump/compressor is adapted to pump liquid, vaporized liquid or a two-phase mixture of vapor and liquid while maintaining the inlet fluid under cryogenic conditions. The gas/liquid composition of the input to the pump/compressor is varied to control the mass flow rate to enable a variable gas outlet feed. The gas can be hydrogen. Flow control is achieved by varying the input density of fluids to the pump. When the pump compressor is drawing vapor only, a conventional auxiliary pressure building circuit is employed to maintain pressure within a liquid storage vessel. In situations in which the pump/compressor is providing more of a compressing function, leakage from piston rings used in the pump/compressor, is recirculated back to the liquid within the storage tank to result in the minimum possible pressure rise in the tank. This leakage, referred to in the patent as "blow-by" is first cooled in an aftercooler to recover refrigeration before being recirculated back to the tank to preserve the coldest recycle temperature possible. Blow-by may also be returned to vapor space of the tank under extremely high flow conditions. The output of this system is heated within vaporizers o produce a gaseous product at about ambient conditions. There is no disclosure in this patent of controlling the density of the gas being compressed by such blow-by nor is there any attempt to control a filling temperature of storage tanks to be filled.

As will be discussed, the present invention provides a vessel filling method and filling station in which the filling temperature of the compressed gas being introduced into the vessel can be accurately controlled by apparatus that is far less complex than the prior art to allow a vessel to be very rapidly and accurately filled with a desired mass of compressed gas and also, without exceeding either the upper or the lower structural temperature limit of the vessel being filled.

SUMMARY OF THE INVENTION

The present invention provides a method of introducing a compressed gas stream into at least one vessel with a controlled fill temperature. In accordance with the invention, a cryogen is stored in a cryogenic, liquid storage tank in a vapor phase and liquid phase. A vapor phase stream is compressed to produce a compressed gas stream. Heat is selectively added to the liquid phase such that a pressure within the vapor phase is held constant and therefore the vapor phase is maintained at constant density. At least part of the compressed gas stream is introduced into the at least one vessel. The fill temperature of the compressed-gas stream is controlled upon introduction thereof into the at least one vessel to be at least about equal to the controlled filling temperature by selectively adding further heat to at least one of the vapor phase stream prior to compression and the compressed gas stream.

By holding the density of the vapor phase constant, an output conditions after compression are also held substantially constant to allow the fill temperature of the compressed gas stream to be accurately and practically controlled even when the fill times are very rapid, for instance, from about 3 minutes to about 5 minutes. The control of density contemplated by the present invention can be accomplished with the most basic of control logic, that is, pressure control, and hence, does not depend on such complicated systems of the prior art involving mixing columns and multiple temperature transducer inputs. Furthermore, by compressing a stream of the vapor phase, although storage tank placement can be above ground, it does not have to be and can be located below ground to reduce the footprint of a filling station incorporating such method. As stated previously, the control of the fill temperature is important so as to prevent underfilling vessels and also to prevent temperature limitations of materials used in fabricating such storage vessels to be exceeded. As will be discussed, the fill temperature can be controlled so that the compressed gas temperature within the vessel during filling is maintained near ambient temperature of the surroundings of the vessel to guarantee the foregoing intended filling of the vessel and temperature limitations.

The heat can be added to the liquid phase by selectively introducing a subsidiary stream, composed of a remaining part of the compressed gas stream, into the liquid phase. First and second subsidiary streams can be formed from the remaining part of said compressed gas stream. In such case, the subsidiary stream introduced into the liquid phase is the first subsidiary stream and the second subsidiary stream is selectively introduced into an inlet of a compressor used in compressing the vapor phase stream to add the further heat to the vapor phase stream In alternative embodiments, further heat is added to the compressed gas stream with either a thermal ballast or a trim heater and flow of a by-pass stream, by-passing said trim heater. Flow of the by-pass stream is controlled to selectively control the further heat added to the compressed gas stream and therefore, the fill temperature. In case of a thermal ballast, the thermal ballast is heated to at least partially store the further heat prior to introduction of the least part of the compressed gas stream into the vessel.

The vapor phase stream can be compressed in a compressor. Prior to the introduction of the compressed gas stream into the at least one vessel, the compressed gas stream is recirculated from the compressor to the liquid phase until the compressed gas temperature at an outlet of the compressor is equal to a compressor delivery set point temperature. After the compressed gas temperature has reached the compressor delivery set point temperature, the at least part of the compressed gas stream is introduced into the at least one vessel and flow of the subsidiary stream to be introduced into the liquid phase is adjusted so that said pressure is held constant.

In such embodiments, the compressed gas can be hydrogen and the at least one vessel is a vehicle fuel tank. The vehicle fuel tank in such case can be formed of a carbon fiber material. The time period to completely fill said vehicle fuel tank can be between about 3 and about 5 minutes and the pressure within the vehicle fuel tank when completely filled can be between about 5,000 psi and about 10,000 psi.

In another aspect, the present invention provides a filling station for introducing a compressed gas stream into at least one vessel with a controlled fill temperature. In accordance with this aspect of the present invention, the filling station comprises a cryogenic, liquid storage tank for storing a cryogen as a vapor phase located above a liquid phase. A compressor for compressing a vapor phase stream of the vapor phase is provided to produce a compressed gas stream. An outlet conduit connected to the compressor introduces at least part of said compressed gas stream into the at least one vessel. A recirculation conduit is connected between the storage tank and an outlet of the compressor such that a subsidiary stream composed of at least a portion of a remaining part of the compressed gas stream, is able to be introduced into the liquid phase, thereby to add heat to said liquid phase and to pressurize the vapor phase. A valve is provided to control flow within said recirculation conduit and a pressure sensor senses pressure within the vapor phase. A controller responsive to the sensed pressure controls the valve such that the pressure is constant and therefore said density of the vapor phase is also held constant. A trim heater adds further heat to the compressed gas stream and a by-pass line by-passes the trim heater. A diverter valve controls the portion of the compressed gas stream that flows through the by-pass line and therefore, the filling temperature to be at least about equal to the controlled filling temperature.

In alternative embodiment of the filling station, first and second recirculation conduits are connected to an outlet of the compressor. The first recirculation conduit is connected to said storage tank such that a first subsidiary stream composed of at least a portion of a remaining part of the compressed gas stream is able to be introduced into said liquid phase to add heat to the liquid phase and thereby pressurize the vapor phase. The second recirculation conduit is connected to an inlet of the compressor to recirculate a second subsidiary stream composed of another portion of a remaining part of the compressed gas stream to an inlet of the compressor so that further heat is added to the vapor phase stream. A first valve controls flow within the first recirculation conduit and a pressure sensor is provided to sense pressure within the vapor phase. A controller responsive to the sensed pressure controls the first valve such that the pressure is constant and therefore the density of the vapor phase is also held constant. A second valve controls flow within the second conduit and therefore a filling temperature of the compressed gas stream to be at least about equal to the controlled fill temperature.

In either embodiment of the filling station, the compressed gas can be hydrogen and the at least one vessel can be a vehicle fuel tank. The storage tank can be located underground and beneath the compressor.

BRIEF DESCRIPTION OF THE DRAWINGS

While the specification concludes with claims distinctly point out the subject matter that applicant regards as his invention, it is believed the invention will be better understood when taken in connection with accompanying figures in which:

DETAILED DESCRIPTION

Figure 1:
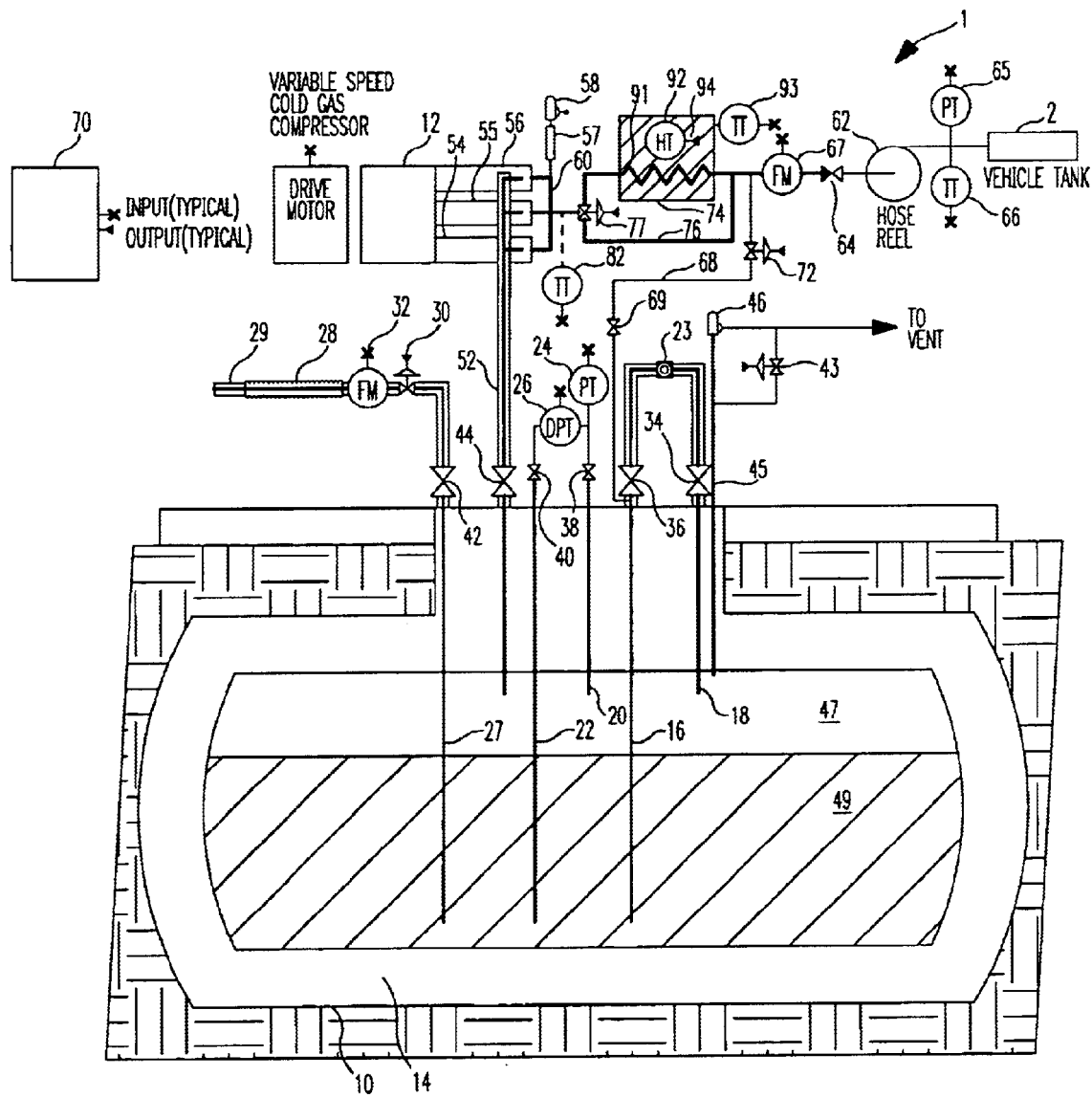
FIG. 1 is a schematic view of a filling station in accordance with the present invention.

With reference to FIG. 1, a filling station 1 in accordance with the present invention is illustrated. Although filling station 1 is specifically designed to be used in connection with the filling of vehicle fuel tanks, such as in vehicle fuel tank 2, it understood that this is for purposes of illustration only. Filling station 1 could be used in connection with compressed natural gas fuels as well as to fill a series of vessels within storage banks to store such compressed gases or other industrial gases.

Filling station 1 consists of a cryogenic liquid storage tank 10 which is preferably located underground and beneath a compressor 12. Liquid storage tank 10 is insulated by a vacuum insulation layer 14. Liquid storage tank 10 is filled with liquid hydrogen through fill lines 16 and 18 connected to a fill connection 23. Fill line 16 projects towards the bottom of cryogenic liquid storage tank 10 while fill line 18 terminates towards the head of cryogenic liquid storage tank 10 to allow liquid hydrogen to be alternatively introduced in a conventional manner to control tank pressure which is preferably about 80 psia. Additionally, instrument lines 20 and 22 are provided to allow for measurement of vapor pressure via pressure sensor 24 and liquid level through differential pressure transducer 26. A liquid product delivery line 27 for delivering liquid from the tank can be provided along with a flexible hose 28 and a known bayonet-type filling nozzle 29.

A control valve 30 and a flow meter 32 are provided to control liquid flow and measure the rate of flow, respectively, within liquid product delivery line 27. Isolation valves 34, 36, 38, 40, and 42 are provided for isolating the aforementioned lines. A isolation valve 44 is provided for isolating an inlet line 52 which shall be discussed hereinafter. Cryogenic liquid storage tank 10 is vented by a vent line 45. Protection for the cryogenic, liquid storage tank 10 is provided by a pressure relief valve 46. A control valve 43 is provided to allow for the slow venting of vapor at a pressure well below that of pressure relief valve 46, for instance 110 psia. When in operation, cryogenic liquid storage tank 10 contains a vapor phase 47 located above a liquid phase 49.

A compressor 12 is connected to the head of cryogenic liquid storage tank 10 to compress a vapor phase stream composed of vapor phase 47 and thereby produce a compressed gas stream. For such purpose inlet line 52 communicates between the inlet of compressor 12 and the head of cryogenic liquid storage tank 10. Compressor 12 is preferably a variable speed compressor of the type having reciprocating pistons enclosed within cylinders 54, 55, and 56. Although not illustrated, a seal is made between the pistons and cylinders 54, 55 and 56 in a known manner, by piston rings. The piston rings have an operational temperature at which they will perform the sealing function. At higher ambient temperatures, the piston rings do not function well and in fact can exhibit wear. A surge tank 57 is provided to smooth out pulsations within the flow leaving the outlet of compressor 12 and a pressure relief valve 58 protects surge tank 57 from over pressures.

A discharge conduit for discharging the compressed gas stream to vehicle fuel tank 2 is provided by an outlet manifold 60 connected to the outlet of compressor 12 and a hose reel 62. A check valve 64 prevents back flow within such discharge conduit. Pressure and temperature within the aforesaid outlet conduit is sensed by way of a pressure transducer 65 and a temperature transducer 66. The rate of flow is sensed by a flow meter 67. Preferably such sensors are situated at or near a high pressure coupling of known design that is configured to be connected to a vehicle fuel tank 2.

In order to allow for the efficient control the fill temperature at which the compressed gas stream is introduced into fuel tank, the density of vapor phase 47 during filling operations is hold constant. For such purpose a conduit is provided by high pressure line 68 which connects to fill line 16 to allow a subsidiary compressed gas stream to be introduced into liquid phase 49. An isolation valve 69 can be set in a closed position to isolate line 68. It is to be noted that although line 68 is connected after a trim heater 74, which will be discussed, line 68 could be connected prior to trim heater 74.

Controller 70 embodies the control logic described herein. Inputs to the controller include the readings of all pressure, temperature and flow transmitters described, operator inputs and set points such as cryogenic tank operating pressure final fill pressure etc. Outputs from the controller include valve positions, compressor 12 start/stop and speed, heater 92 on/off, and parameter readings, information to generate a bill for product delivered or optionally a printed bill. The controller logic can be any known control mechanism including a programmable logic controller, a timer relay panel, or pneumatic logic.

The introduction of subsidiary compressed gas stream into liquid phase 49 causes liquid to vaporize into the vapor phase 47. Pressure within vapor phase 47 is measured by pressure sensor 24 that transmits an electrical signal to a controller 70 that is referable to the pressure. Controller 70 activates a pressure control valve 72 to control the flow of the subsidiary gas stream. Adding the gas to the liquid via conduit 16 maintains a temperature in headspace 47 that is essentially the saturation temperature of liquid within liquid phase 49. In such manner, the density of vapor phase 47 is held constant. As will be discussed, the temperature of the compressed gas stream is controlled by the addition of heat. Such control becomes difficult if not impossible if such density of vapor phase 47 is not held constant.

In place of the foregoing, a submerged electrical heater could be provided for adding heat to the liquid phase as well as other heat sources.

The filling temperature is controlled by adding heat by means of the heat of compression which may be augmented by a trim heater 74 which can be an electrical heater 92 and heat exchanger 91 embedded within an aluminum block or other thermal ballast 94, that is continuously powered to a nominal temperature of about 120° F. The ballast temperature is measured with temperature transmitter 93. Other known indirect heat exchange devises could be used. Preferably, the heat stored in the thermal ballast between filling vehicle fuel tanks is sufficient that further heat addition to the ballast is not necessary while the compressor is running. The power demand rate of the filling station is thereby reduced. Although the power to such electrical heater could be varied, for rapid response, a by-pass conduit 76 can be provided for flow of a stream of compressed gas which is not heated to by-pass trim heater 74. Diverter valve 77 controls the portion of the compressed gas stream that flows within by-pass conduit 76 to in turn control the amount of heat that is added to the compressed gas stream to in turn control the filling temperature.

Many receivers have lower structural limiting temperatures of −40° F. If the filling temperature required to hold temperature within the vessel near ambient is less than the structural limit, localized cooling will occur. In these cases the fill rate must be reduced so that the required fill temperature is not below the structural limit. Although this is usually not the necessary variable speed compressor 12 accommodates these instances.

During time periods between filling, a standby mode of operation is contemplated in which isolation valves 38, 40, 42, 44 and 69 are set in open positions. Isolation valves 34 and 36 are set in closed positions. Control valve 72 is set in an open position. If the pressure within vapor phase 47 as sensed by pressure sensor 24 falls below a lower set point, which can be 95 psig, controller 70 sets valve 77 in to divert the entire compressed gas stream through trim heater 74 and compressor 12 is started. When a set vapor phase pressure is regained, which can be 100 psig, compressor 12 stops.

When filling is to be commenced, a user connects the hose of hose reel 62 to fuel tank 2. A compressor cool down cycle begins in which control valves 72 and 77 are set in open positions and compressor 12 is started. When compressor discharge temperature reaches a compressor set point temperature, as sensed by temperature sensor 82 at the outlet of compressor 12, controller 70 initiates closure of valve 72 forcing the compressed gas stream into vehicle fuel tank. The compressor set point temperature for compressor 12 is the temperature at which the piston rings are operable. During filling, valve 72 is reset to maintain a constant pressure within vapor phase 47 and therefore a constant density. During filling, control valve 77 is set to adjust fill temperature as sensed by temperature sensor 65 at least be equal to about a controlled fill temperature that can be selected to control the temperature of compressed gas within vehicle fuel tank 2 to be between upper and lower temperature limits and to fill the vehicle fuel tank 2 to required fill levels. Control valve 77 is controlled in response to signals from temperature transmitter 66.

As mentioned above, in order to ensure the safe filling of a composite tank, for instance one manufactured with carbon fiber reinforcing, an upper temperature limit of 185° F. should not be exceeded. A lower temperature limit would be −40° F. In order to ensure a factor of safety, the maximum fill temperature of the charged hydrogen might be restricted to 150° F. Where vehicle fuel tank 2 is to be completely filled under hot ambient conditions e.g. 120° F., 14.7 psia to 5,000 or 10,000 psia, sub-ambient fill temperatures are required. For instance, to fill the tank to 5,000 psia without exceeding 150° F., the constant fill temperature should be no more than about 10° F. To fill to 10,000 psia, the fill temperature should be no more than about −25° F.

In order to properly fill such a tank as mentioned above to a desired pressure without underfilling, it is advantageous for the maximum fill temperature of the compressed hydrogen to be ambient (i.e. 120° F. in this example). To fill the tank to 5,000 psia without exceeding 120° F., the constant fill temperature should be no more than about −15° F. To fill to 10,000 psia, the fill temperature should be no more than about −40° F.

In order to set the temperature control properly, pressure and temperature is initially measured by pressure and temperature sensors 66 and 65 prior to filling to obtain pressure and temperature inside vehicle fuel tank 2. The fill temperature would be computed by known thermodynamic equations of state.

Figure 2:
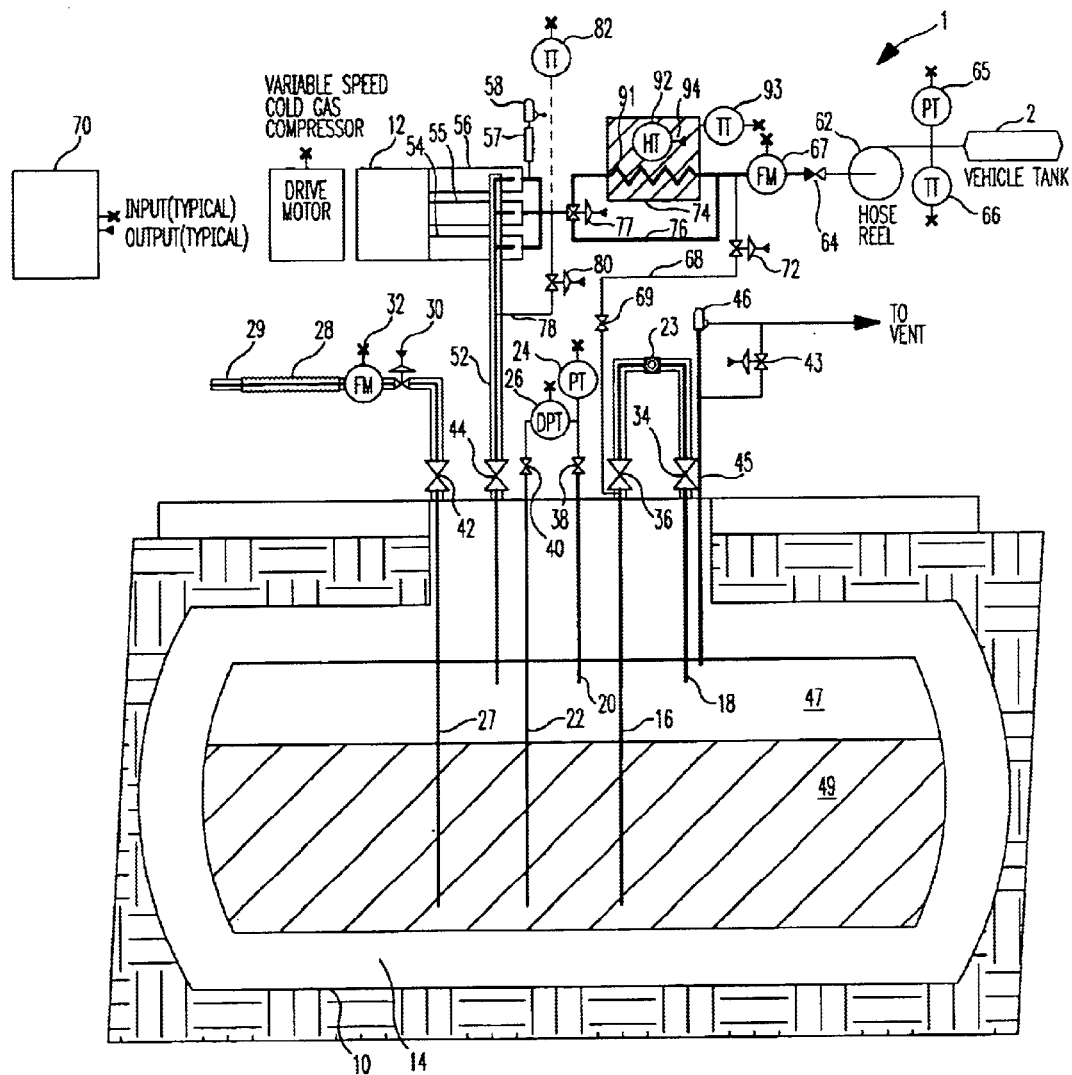
FIG. 2 is a schematic view of an alternative embodiment of the filling station of the present invention. Reference numbers for elements having the same function as those shown in FIG. 1 are repeated to avoid needless repetition of explanation.

With reference to FIG. 2, in an alternative embodiment, designated as filling station 1', the filling temperature can be controlled either alone or in combination with the trim heater 74 assemblage as aforesaid by provision of a high pressure line 78 which provides a second conduit for recirculation of the flow of a second subsidiary stream composed of the compressed gas stream to the inlet of compressor 12. Flow within high pressure line is controlled by a flow control valve 80. The greater the flow within high pressure line 78, the greater the degree of heat added to the vapor entering the compressor, the greater the temperature of the compressed gas stream and therefore the greater the filling temperature.

While the present invention has been described with reference to preferred embodiment, as will occurred to those skilled in the art, numerous changes, additions and omissions can be made without departing from the spirit and the scope of the present invention.

I claim:

1. A method of introducing a compressed gas stream into at least one vessel with a controlled fill temperature, said method comprising:

storing a cryogen in a cryogenic, liquid storage tank in a vapor phase and liquid phase;

compressing a vapor phase stream to produce a compressed gas stream;

selectively adding heat to the liquid phase such that a pressure within the vapor phase is held constant and therefore said vapor phase is maintained at constant density;

introducing at least part of the compressed gas stream into the at least one vessel; and controlling a fill temperature of the compressed gas stream upon introduction thereof into said at least one vessel to be at least about equal to said controlled filling temperature by selectively adding further heat to at least one of the vapor phase stream prior to compression and the compressed gas stream.

2. The method of claim 1, wherein said heat is added to the liquid phase by selectively introducing a subsidiary stream, composed of a remaining part of the compressed gas stream, into the liquid phase.

3. The method of claim 2, wherein:

first and second subsidiary streams are formed from said remaining part of said compressed gas stream;

said subsidiary stream is the first subsidiary stream; and said second subsidiary stream is selectively introduced into an inlet of a compressor used in compressing said vapor phase stream to add said further heat to said vapor phase stream.

4. The method of claim 2, wherein said further heat is added to the compressed gas stream from a thermal ballast and by-pass stream, by-passing said thermal ballast and said flow of said by-pass stream is controlled to selectively control said further heat added to said compressed gas stream and therefore said fill temperature, the thermal ballast being heated to at least partially store the further heat prior to introduction of the least part of the compressed gas stream into the at least one vessel.

5. The method of claim 2, wherein said further heat is added to the compressed gas stream with a trim heater and flow of a by-pass stream, by-passing said trim heater and said flow of said by-pass stream is controlled to selectively control said further heat added to said compressed gas stream and therefore said fill temperature.

6. The method of claim 1 or claim 2 or claim 3 or claim 4 or claim 5, wherein:

said vapor phase stream is compressed in a compressor;

prior to the introduction of the compressed gas stream into said at least one vessel, the compressed gas stream is recirculated from the compressor to the liquid phase until the compressed gas temperature at an outlet of the compressor is equal to a compressor delivery set point temperature; and after said compressed gas temperature has reached said compressor delivery set point temperature, the least part of the compressed gas stream into the at least one vessel and flow of the subsidiary stream to be introduced into the liquid phase is adjusted so that said pressure is held constant.

7. The method of claim 6, wherein said compressed gas stream is hydrogen and said at least one vessel is a vehicle fuel tank.

8. The method of claim 7, wherein said vehicle fuel tank is formed of a carbon fiber material.

9. The method of claim 8, wherein a time period to completely fill said vehicle fuel tank is between about 3 and about 5 minutes and a pressure within said vehicle fuel tank when completely filled is between about 5,000 psi and about 10,000 psi.

10. A filling station for introducing a compressed gas stream into at least one vessel at a controlled fill temperature, said filling station comprising:

a cryogenic, liquid storage tank for storing a cryogen as a vapor phase located above a liquid phase;

a compressor for compressing a vapor phase stream of said vapor phase to produce said compressed gas stream;

an outlet conduit for introducing at least part of said compressed gas stream into said at least one vessel;

a recirculation conduit connected between the storage tank and an outlet of the compressor such that a subsidiary stream composed of at least a portion of a remaining part of the compressed gas stream, is able to be introduced into said liquid phase, thereby to add heat to said liquid phase and thereby to pressurize said vapor phase;

a valve to control flow within said recirculation conduit;

a pressure sensor to sense pressure within the vapor phase;

a controller responsive to the sensed pressure to control said valve such that said pressure is held constant and therefore said density of said vapor phase; and a trim heater to add further heat to said compressed gas stream;

a by-pass line by-passing said trim heater; and a by-pass valve within said by-pass line to control flow within the by-pass line and therefore, the fill temperature to be at least about equal to the controlled fill temperature.

11. A filling station for introducing a compressed gas stream into at least one vessel with a controlled fill temperature, said filling station comprising:

a cryogenic liquid storage tank for storing a cryogen as a vapor phase located above a liquid phase;

a compressor for compressing a vapor phase stream of said vapor phase to produce a compressed gas stream;

an outlet conduit for introducing at least part of said compressed gas stream and therefore, said compressed gas, into said at least one vessel;

first and second recirculation conduits connected to an outlet of the compressor;

the first recirculation conduit connected to said storage tank such that a first subsidiary stream composed of at least a portion of a remaining part of the compressed gas stream, is able to be introduced into said liquid phase to add heat to said liquid phase and thereby pressurize said vapor phase;

the second recirculation conduit connected to an inlet of the compressor to recirculate a second subsidiary stream composed of another portion of a remaining part of said compressed gas stream to an inlet of said compressor so that further heat is added to said vapor phase stream;

a first valve to control flow within said first recirculation conduit;

a pressure sensor to sense pressure within the vapor phase;

a controller responsive to the sensed pressure to control said first valve such that said pressure is constant and therefore said density of said vapor phase; and a second valve to control flow within said second conduit and therefore a filling temperature of said compressed gas stream to be at least about equal to the controlled fill temperature.

12. The filling station of claim 10 or claim 11, wherein said compressed gas is hydrogen and said at least one vessel is a vehicle fuel tank.

13. The filling station of claim 12, wherein said storage tank is located underground and beneath said compressor.

* * * * *